Aug. 17, 1926.
H. H. BRUGMANN
1,596,799
NUT LOCK
Filed Oct. 16, 1923
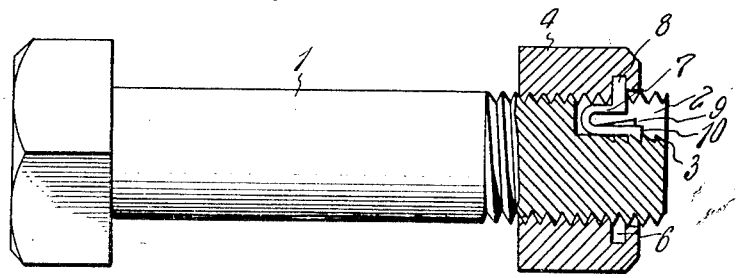
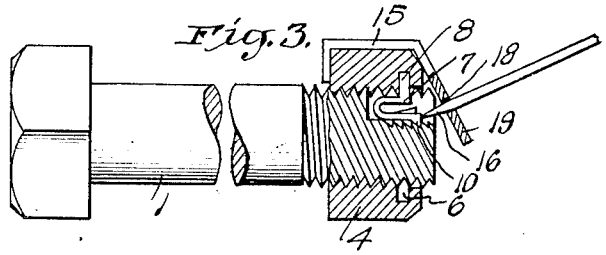
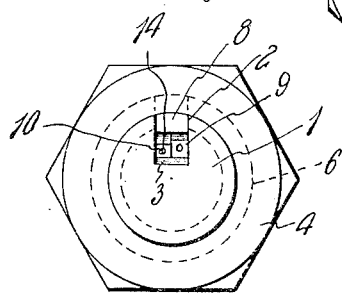
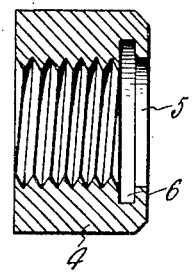
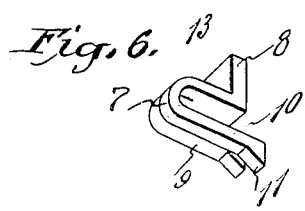
H. H. Brugmann
INVENTOR
WITNESS:
ATTORNEY Patented Aug. 17, 1926.

1,596,799

UNITED STATES PATENT OFFICE.

HERMAN H. BRUGMANN, OF EVERLY, IOWA.

NUT LOCK.

Application filed October 16, 1923. Serial No. 668,897.

My present invention has reference to a means for locking a nut from unscrewing on a bolt.

A further object is to produce a nut lock characteristic of simplicity in construction, ease in application and thorough efficiency in operation.

A still further object is to produce a means of locking a nut on a bolt which engages these elements after the nut has been screwed home upon the bolt and which is of a construction whereby the same may be removed to permit of the unscrewing of the nut from the bolt.

In the drawings which accompany and which form part of this application:—

Figure 1 is an elevation of a nut locked on a bolt in accordance with this invention, a portion of the nut and bolt being in section.

Figure 2 is an end view thereof.

Figure 3 is a view showing the manner in which the locking element may be removed from locking engagement.

Figure 4 is an approximately central longitudinal sectional view through the nut.

Figure 5 is a plan view of the bolt.

Figure 6 is a perspective view of the locking element.

Figure 7 is a similar view of a modified form of locking element.

The bolt 1 has its shank, from its threaded end formed with a longitudinal depression 2, and the lower wall of this depression is formed with teeth 3.

The nut 4 is of the ordinary construction, except that the same has its bore at its outer end non-threaded, as at 5, and provided with an annular groove 6 at the terminal of the said non-threaded portion.

My locking element has a portion thereof received in the groove 6 of the nut 4, preferably when the nut is initially screwed on the bolt. The locking element is in the nature of a spring having a substantially U-shaped body 7 one limb of which being of a greater length than the other. The shorter limb has its end upturned to form the same with a lug 8. The longer limb is slit centrally and longitudinally. The portion of the longer limb to one side of the slot thereof is preferably of a less length than the second portion so that two spring fingers 9 and 10 are thus provided. Each of the fingers has its outer corner formed with a tooth, and these teeth are designed to engage with the teeth 3 in the depression 2 of the bolt 1 when the locking element is inserted in the said depression and compressed to permit of the lug 9 thereof being received in the annular depression or groove 6 in the nut 4. In this manner it will be seen that the nut is effectively locked on the bolt. The locking element may have its base slitted and cut to provide any desired number of fingers which vary in length, all of the said fingers, however, being provided with teeth. This construction is illustrated in Figure 6 of the drawings. Preferably the slits which divide the bottom of the locking element extend through the rounded rear portion thereof, and into the upper limb 13, the same, however, terminating a suitable distance from the lug 8. It is to be noted that the lug 8 of the locking element is freely received in the groove 6 of the nut, so that the screwing of the nut on the bolt will cause the locking element to move longitudinally with the nut. The contacting engagement of the U-shaped body of the locking element with the side walls provided by the depression 2 in the bolt 1 will hold the said locking element in the depression, and the teeth, on the split spring fingers of the locking element will ratchet over the teeth 3 in the lower wall of the depression 2.

Preferably the outer face of each tooth carrying finger is formed with a depression 14, and in removing the nut from the bolt I arrange over the said bolt an angle strap 15 whose outer portion is provided with an opening through which is inserted the pointed end 16 of an instrument 17. The end of the instrument is provided with as many faces as there are fingers on the locking element, and the instrument is fulcrumed on the lower wall of the opening 18 in the outer inclined flanged portion 19 of the member 15 so that a downward pressure upon the outer end of the said instrument 17 will raise the teeth 11 on the fingers of the lock out of engagement between the teeth 3 in the bolt 2. A further pressure will cause the withdrawal of the locking element from the nut, but as long as pressure is retained on the instrument 17 the nut may be unscrewed from the bolt by the employment of the usual wrench and the locking element removed therewith.

Having described the invention, I claim:—

The combination with a bolt and a nut designed to be screwed on the bolt, and in which said bolt has a longitudinal depression from its threaded end whose lower wall is formed with teeth and in which the nut has its bore provided with an annular groove adjacent to its upper end, and a cross sectionally U-shaped lock having one of its ends formed with an offset lug to be loosely received in the groove of the nut and its U-shaped body received in the depression of the bolt, and the outer element of the said body being slitted and having the ends thereof formed with teeth to engage the teeth in the depression of the bolt and to ratchet over the said teeth in the depression when the nut is screwed home on the bolt.

In testimony whereof I affix my signature.

HERMAN H. BRUGMANN.